(12) United States Patent
Kuge et al.

(10) Patent No.: US 8,788,435 B2
(45) Date of Patent: Jul. 22, 2014

(54) DRIVING MANEUVER ASSISTING APPARATUS AND METHOD FOR ASSISTING DRIVING MANEUVER

(75) Inventors: Nobuyuki Kuge, Zushi (JP); Kazuto Sato, Atsugi (JP); Hirofumi Hashiguchi, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 484 days.

(21) Appl. No.: 13/060,538

(22) PCT Filed: Jun. 12, 2009

(86) PCT No.: PCT/JP2009/060728
§ 371 (c)(1),
(2), (4) Date: Feb. 24, 2011

(87) PCT Pub. No.: WO2010/032522
PCT Pub. Date: Mar. 25, 2010

(65) Prior Publication Data
US 2011/0153532 A1 Jun. 23, 2011

(30) Foreign Application Priority Data
Sep. 18, 2008 (JP) .................................. 2008-239781

(51) Int. Cl.
*G06F 15/18* (2006.01)
(52) U.S. Cl.
USPC ........................................................ 706/12
(58) Field of Classification Search
None
See application file for complete search history.

(56) References Cited

U.S. PATENT DOCUMENTS

2004/0252027 A1* 12/2004 Torkkola et al. ............... 340/576
2006/0109094 A1 5/2006 Prakah-Asante et al.

(Continued)

FOREIGN PATENT DOCUMENTS

JP 03-260900 A 11/1991
JP 09-109724 A 4/1997

(Continued)

OTHER PUBLICATIONS

Chernova and Veloso, "Multi-Thresholded Approach to Demonstation Selection for Interactive Robot Learing", Proceedings of the 3rd ACM/IEEE international conference on Human robot interaction, ACM, New York, NY, Mar. 2008, pp. 225-232.*
Torkkola, Venkatesan, Liu, "Sensor Sequence Modeling for Driving", Proceedings of the Eighteenth International Florida Artificial Intelligence Research Society Conference, FLAIRS conference 2005, 2005, pp. 721-727.*

(Continued)

*Primary Examiner* — Kakali Chaki
*Assistant Examiner* — Walter Hanchak
(74) *Attorney, Agent, or Firm* — Foley & Lardner LLP

(57) ABSTRACT

A driving maneuver assisting apparatus includes a learning section configured to learn a driving-behavior pattern of a driver for a predetermined duration; a non-steady-state degree calculating section configured to calculate a non-steady-state degree by comparing a current driving-behavior pattern with the driving-behavior pattern learned by the learning section, wherein the non-steady-state degree represents how different the current driving-behavior pattern is from the driving-behavior pattern learned by the learning section; a learning level calculating section configured to calculate a learning level of the learning section; and a notifying section configured to notify the driver of a maneuver assisting information for inducing the driving-behavior pattern learned by the learning section in accordance with the learning level calculated by the learning level calculating section, when the non-steady-state degree calculated by the non-steady-state degree calculating section exceeds a threshold value. The notifying section is configured to provide contents of the maneuver assisting information in more detail as the learning level calculated by the learning level calculating section becomes higher.

14 Claims, 15 Drawing Sheets

(56) References Cited

U.S. PATENT DOCUMENTS

| | | |
|---|---|---|
| 2006/0147089 A1* | 7/2006 | Han et al. ............... 382/104 |
| 2009/0040054 A1* | 2/2009 | Wang et al. .............. 340/576 |
| 2010/0241605 A1* | 9/2010 | Groitzsch et al. ........... 706/47 |

FOREIGN PATENT DOCUMENTS

| | | |
|---|---|---|
| JP | 2000-149161 A | 5/2000 |
| JP | 2005-301832 A | 10/2005 |
| JP | 2007-249539 A | 9/2007 |

OTHER PUBLICATIONS

Bradtke and Barto, "Linear Least-Squares Algorithms for temporal Difference Learning", Machine Learning, vol. 22, 1996, pp. 33-57.*

Nishiwaki, Osawa, Wakita, Miyajima, Itou, Takeda, "Driver Identification Based on Spectral Analysis of Driving Behavioral Signals", chapter 3 in Abut, Hansen, Kazuya, Eds., "Advances for In-vehicle Systems: Challenges for International Standards", Springer-Verlag, Berlin, 2007, pp. 25-34.*

Kim, "Analysis of Variability in Car-Following Behavior Over Long-Term Driving Maneuvers", University of Maryland, Phd Thesis, 2005, pp. 1-175.*

* cited by examiner

FIG.7

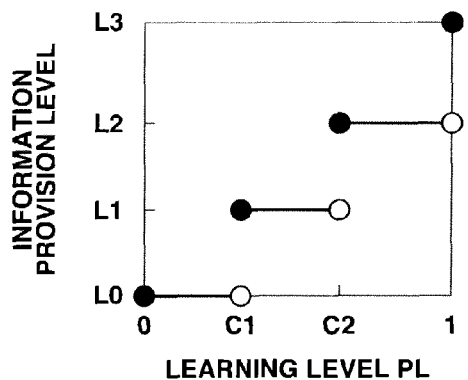

FIG.8

| LEVEL | DETAIL LEVEL | INFORMATION PROVISION CONTENTS |
|---|---|---|
| L3 | FACT + CAUTION | "INTER-VEHICLE DISTANCE IS SHORTER THAN USUAL. DRIVE WITH CAUTION." |
| L2 | FACT | "INTER-VEHICLE DISTANCE IS SHORTER THAN USUAL" |
| L1 | ATTENTION CONTENTS | "PAY ATTENTION TO PRECEDING VEHICLE" |
| L0 | NO NOTIFICATION | — |

FIG.9

| LEVEL | DETAIL LEVEL | INFORMATION PROVISION CONTENTS |
|---|---|---|
| L3 | FACT + CAUTION | "STEERING OPERATION IS ROUGHER THAN USUAL. DRIVE WITH CAUTION." |
| L2 | FACT | "STEERING OPERATION IS ROUGHER THAN USUAL" |
| L1 | ATTENTION CONTENTS | "PAY ATTENTION TO WOBBLE" |
| L0 | NO NOTIFICATION | — |

FIG.16

```
START
  ↓
READ VARIOUS DATA — S1
  ↓
CALCULATE INTER-VEHICLE TIME THW — S2
  ↓
CALCULATE FREQUENCY DISTRIBUTION — S3
  ↓
CALCULATES NON-STEADY-STATE DEGREE DDf — S4
  ↓
CALCULATE ESTIMATION ERROR OF STEERING ANGLE — S5
  ↓
CALCULATE FREQUENCY DISTRIBUTION — S6
  ↓
CALCULATE NON-STEADY-STATE DEGREE DDs — S7
  ↓
CALCULATE LEARNING LEVEL PL — S8
  ↓
SET ENVIRONMENTAL FLAG — S41
  ↓
CORRECT LEARNING LEVEL PL — S42
  ↓
DDf > Sfo or DDs > Sso — S9
  YES ↓        NO →
SET INFORMATION PROVISION LEVEL — S10
  ↓
OUTPUT MANEUVER ASSISTING INFORMATION — S11
  ↓
RETURN
```

FIG.17

| ENVIRONMENTAL FLAG | PARAMETER | DETECTION CONDITION |
|---|---|---|
| F = 0 | DAYTIME | LIGHT SWITCH OFF |
| F = 1 | NIGHTTIME | LIGHT SWITCH ON |

FIG.18

| ENVIRONMENTAL FLAG | PARAMETER | DETECTION CONDITION |
|---|---|---|
| F = 0 | WEATHER: GOOD | WIPER SWITCH OFF |
| F = 1 | WEATHER: BAD | WIPER SWITCH ON |

FIG.19
| ENVIRONMENTAL FLAG | PARAMETER | DETECTION CONDITION |
|---|---|---|
| F = 0 | TRAFFIC VOLUME: LOW | VICS TRAFFIC-VOLUME LEVEL: LOW |
| F = 1 | TRAFFIC VOLUME: HIGH | VICS TRAFFIC-VOLUME LEVEL: HIGH |
FIG.20
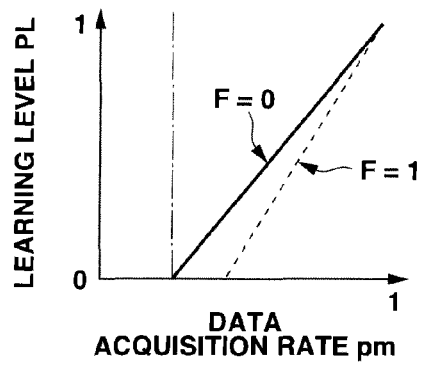
FIG.21
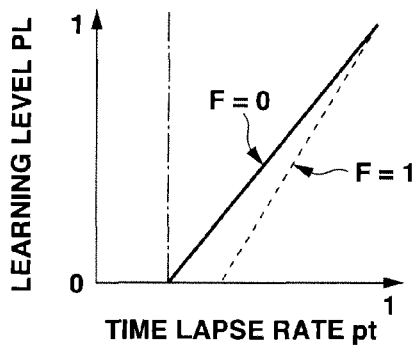

DRIVING MANEUVER ASSISTING APPARATUS AND METHOD FOR ASSISTING DRIVING MANEUVER

TECHNICAL FIELD

The present invention relates to a driving maneuver assisting apparatus and/or method that supplies a maneuver assisting information to a driver in accordance with a running state of vehicle.

BACKGROUND ART

There has been a technique in which an individual usual driving-behavior pattern differing from driver to driver is previously learned, and thereby a necessary maneuver assisting information is outputted by judging whether or not a current driving-behavior pattern differs from usual (see Patent Document 1).

Patent Document 1: Japanese Patent Application Publication No. 2005-301832

SUMMARY OF THE INVENTION

However, in the earlier technique disclosed in the Patent Document 1, an accuracy of judging whether or not the current driving-behavior pattern is different from usual is low during a process of learning the usual driving-behavior pattern. At this time, there is a possibility that a strangeness feeling is given to the driver due to an improper maneuver assisting information.

It is an object of the present invention to provide an appropriate maneuver assisting information to the driver even during the process of learning the driving-behavior pattern of driver.

In one aspect of driving maneuver assisting apparatus according to the present invention, a driving-behavior pattern of a driver is previously learned for a predetermined duration; a non-steady-state degree representing how different the current driving-behavior pattern is from the learned driving-behavior pattern is calculated by comparing a current driving-behavior pattern with the learned driving-behavior pattern; the driver is notified of a maneuver assisting information for inducing the learned driving-behavior pattern, when the calculated non-steady-state degree exceeds a threshold value; and contents of the maneuver assisting information are provided in more detail as a learning level of the driving-behavior pattern of the driver becomes higher, during a process of learning the driving-behavior pattern.

BRIEF EXPLANATION OF DRAWINGS

FIG. 7 A table that is used for setting an information provision level.

FIG. 8 One example of maneuver assisting information related to the inter-vehicle time.

FIG. 9 One example of maneuver assisting information related to a steering operation.

FIG. 16 A flowchart showing a maneuver assisting processing in the fourth embodiment.

FIG. 17 A table that is used for setting an environmental flag.

FIG. 18 A table that is used for setting the environmental flag.

FIG. 19 A table that is used for setting the environmental flag.

FIG. 20 A map that is used for calculating the learning level PL.

FIG. 21 A map that is used for calculating the learning level PL.

EMBODIMENTS FOR CARRYING OUT THE INVENTION

Figure 1:
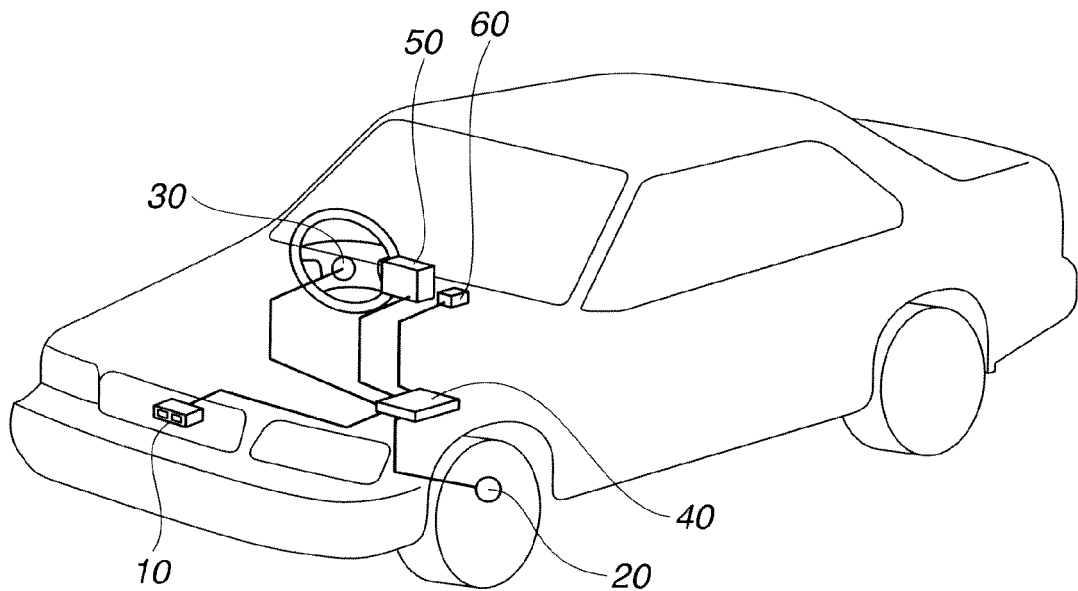
FIG. 1 A schematic structural view according to the present invention.

Hereinafter, embodiments according to the present invention will be explained referring to the drawings.

First Embodiment

Configuration

Figure 2:
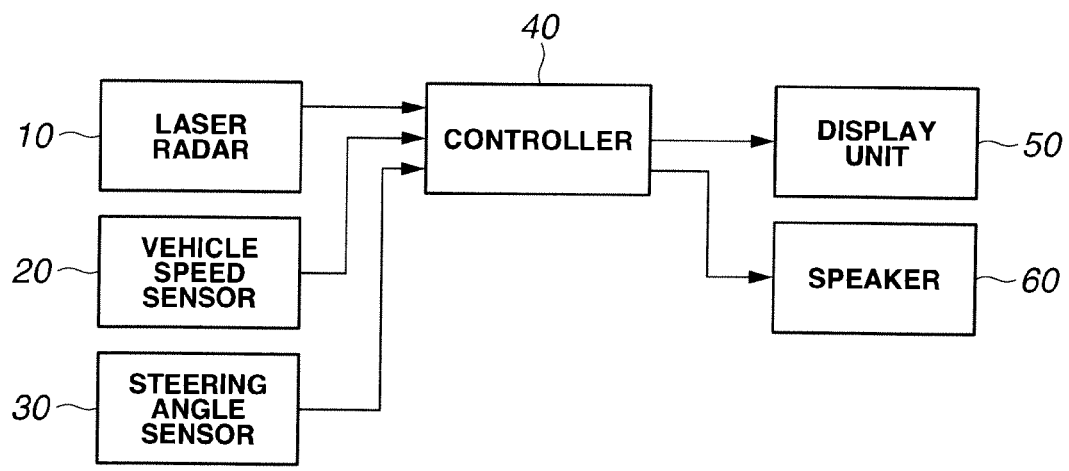
FIG. 2 A block diagram showing the schematic structure according to the present invention.

FIG. 1 is a view showing a schematic structure of a driving maneuver assisting apparatus according to the present invention. FIG. 2 is a block diagram of the driving maneuver assisting apparatus. A laser-radar 10 is provided to a front grille, bumper or the like of a host vehicle. The laser-radar 10 functions to scan a front region of the host vehicle (i.e., a region located ahead of the host vehicle) by irradiating the front region with an infrared light pulse in a horizontal direction. The laser-radar 10 measures a reflected wave of the infrared light pulse. This reflected wave is produced by causing the infrared light pulse to be reflected by a plurality of reflective objects (normally, reflected by a rear end of a preceding vehicle) which exist in the front region of the host vehicle. By an arrival time of this reflected wave, the laser-radar 10 detects an inter-vehicle distance D and a relative speed Vr between the host vehicle and the plurality of obstructions (reflective objects, normally, the rear end of the preceding vehicle). The detected inter-vehicle distance D and the relative speed Vr are outputted to a controller 40. The front region which is scanned by the laser-radar 10, for example, ranges approximately within ±6 degrees from an imaginary line extending straightly in front of the host vehicle. That is, any front object existing within this range is detected.

A vehicle speed sensor 20 detects a speed V of the host vehicle by measuring a rotational speed of a road wheel or a rotational speed of output side of a transmission. The detected vehicle speed V is outputted to the controller 40. A steering angle sensor 30 detects a steering angle θ of a steering wheel. The detected steering angle θ is outputted to the controller 40. The controller 40 includes a CPU and CPU peripheral components such as ROM and RAM. The controller 40 conducts a driving diagnosis by analyzing a driving characteristic of a driver on the basis of inputted various signals. Then, the controller 40 provides a maneuver (manipulation) assisting information to the driver on the basis of this diagnosis result. The maneuver assisting information is, for example, an alarm (warning) and/or an advice, and is supplied through a display unit 50 and a speaker 60 to the driver. As the display unit 50, for example, a displaying monitor of a navigation system or a combination meter (instrument cluster) is used.

Figure 3:
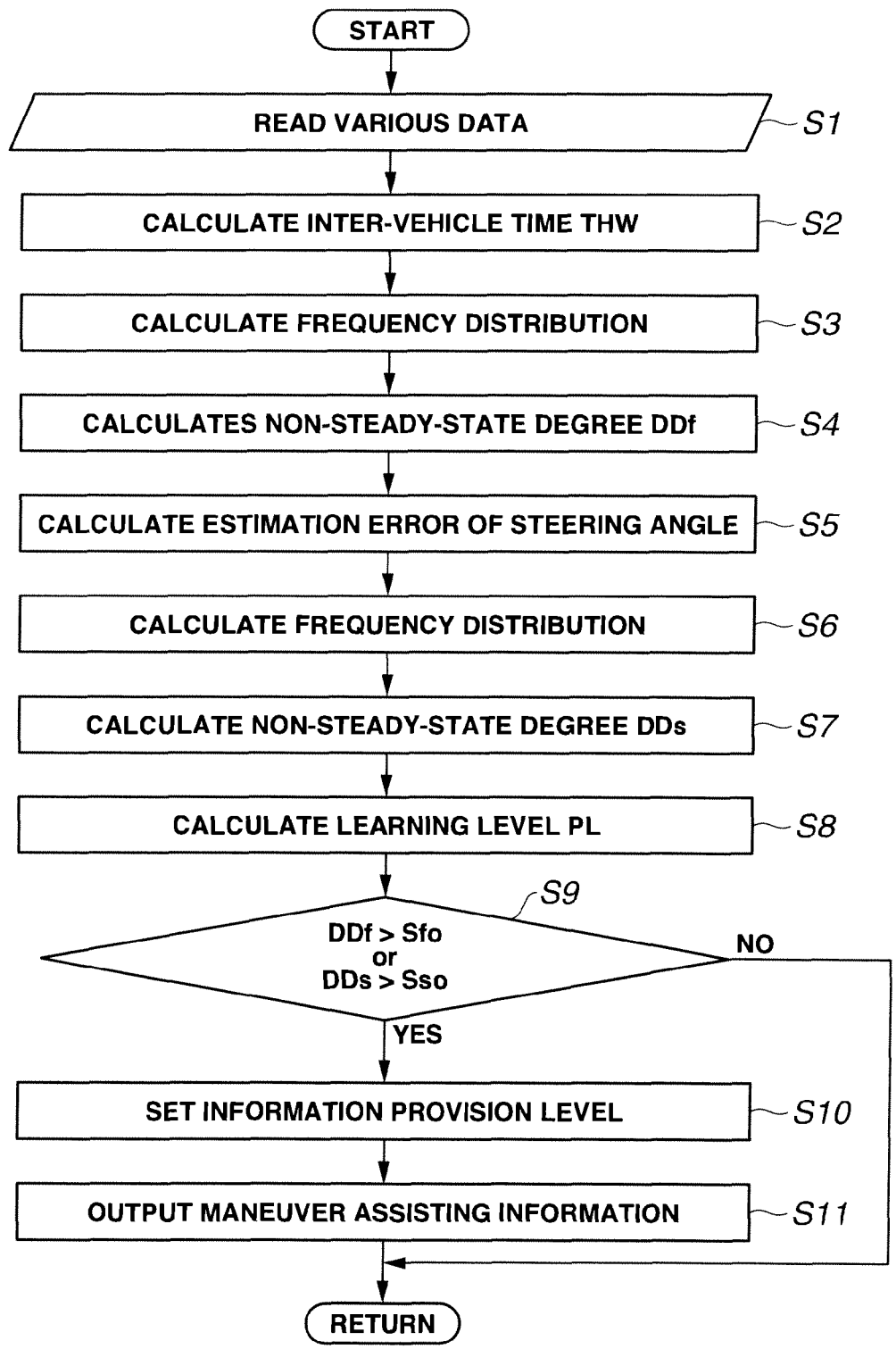
FIG. 3 A flowchart showing a maneuver assisting processing in a first embodiment.

Next, a maneuver assisting process which is executed in the controller 40 at predetermined time intervals (e.g., 50 milliseconds) will now be explained referring to a flowchart of FIG. 3. At first, at step S1, the controller (controller 40) reads various data. At subsequent step S2, the controller calculates an inter-vehicle time (headway time) THW between the host vehicle and the preceding vehicle (i.e., fore-going vehicle), as shown in the following formula (1). The inter-vehicle time THW is defined as a value obtained by dividing the inter-vehicle distance D by the vehicle speed V. Hence, the inter-vehicle time THW means a time necessary for the host vehicle to reach a current location of the preceding vehicle.

$$THW=D/V \tag{1}$$

At subsequent step S3, the controller calculates a frequency distribution of the inter-vehicle time THW. Then, the controller calculates a cumulative frequency distribution of the inter-vehicle time THW within each of two predetermined durations (two time lengths) TL1 and TL2 which are different from each other. In order to eliminate a state where the relative speed Vr is varying with a large degree because of an acceleration or the like of any one of the host vehicle and the preceding vehicle, a sampling for the cumulative frequency distribution is carried out under a condition where the relative speed Vr falls within a range of, for example, ±5 km/h and where the inter-vehicle time THW falls within, for example, a range below 4 seconds. The predetermined duration TL1 is a time length necessary to grasp (learn) a usual driving-behavior pattern of the driver. For example, the predetermined duration TL1 is set at 2160 seconds. The predetermined duration TL2 is a time length necessary to grasp a latest driving-behavior pattern. For example, the predetermined duration TL2 is set at 60 seconds.

Each of the two frequency distributions is updated at the time of every obtainment of new data of the inter-vehicle time THW (i.e., is updated whenever a new data of the inter-vehicle time THW is measured). For example, an entire zone (block) given between 0 seconds and 4 seconds is divided (segmentalized) into small zones (blocks) m1 to m20 each of which has a width equal to 0.2 seconds. Frequency values tp1 to tp20 of the respective small zones are updated when the new data is obtained. At first, a frequency tpi of a small zone mi within which the new data falls (i.e., a small zone mi to which the new data corresponds) is calculated by the following formula (2).

$$tpi=(tpi+1/Nt)\div(1+1/Nt) \tag{2}$$

wherein, Nt denotes the total number of samples.

Moreover, a frequency tpi of a small zone mi within which the new data does not fall (i.e., a small zone mi to which the new data does not correspond) is calculated by the following formula (3).

$$tpi=tpi\div(1+1/Nt) \tag{3}$$

A frequency distribution data of average driver is set as initial values. That is, a normal distribution is used which has an average value equal to the extent of 1.4 seconds and a dispersion equal to the extent of 0.5 seconds in the inter-vehicle time THW.

Figure 4:
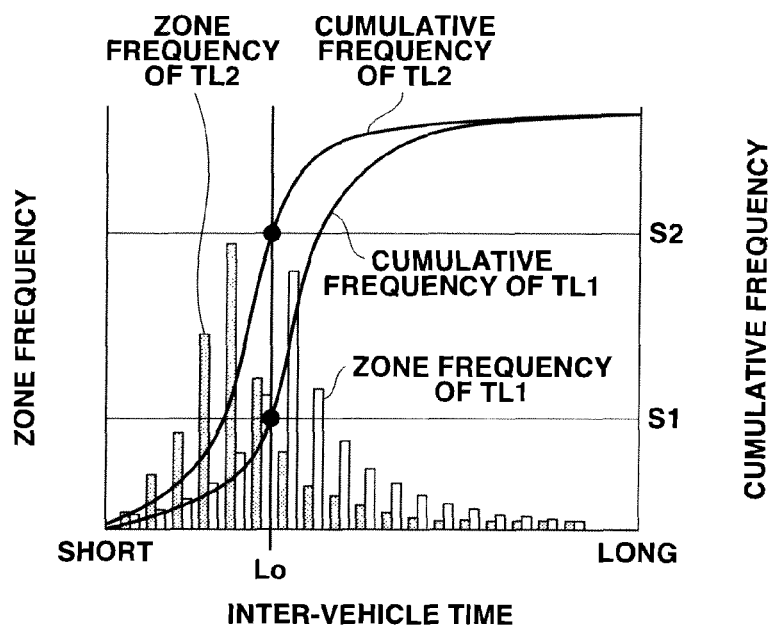
FIG. 4 A view showing frequency distributions of inter-vehicle time.

At subsequent step S4, the controller calculates a non-steady-state degree DDf on the basis of the two frequency distributions of inter-vehicle time THW. This non-steady-state degree DDf represents a degree at which a current driving-behavior pattern is different from the usual driving-behavior pattern (normal driving behavior). That is, the non-steady-state degree DDf represents how different the current driving-behavior pattern is as compared with the usual behavior. At first, as shown in FIG. 4, the controller calculates a cumulative frequency S1 of the predetermined duration TL1 and a cumulative frequency S2 of the predetermined duration TL2. Each of the cumulative frequency S1 and the cumulative frequency S2 is defined as a frequency value of the inter-vehicle times THW which are lower than or equal to a predetermined value Lo. Then, the controller calculates a difference between the cumulative frequency S1 and the cumulative frequency S2 as the non-steady-state degree DDf, as shown in the following formula (4). As understood from the formula (4), the non-steady-state degree DDf becomes larger as the cumulative frequency S2 at which the inter-vehicle time THW is lower than or equal to the predetermined value Lo becomes larger.

$$DDf=S2-S1 \tag{4}$$

At subsequent step S5, the controller estimates a current steering angle on the basis of a varying state of steering angle indicated nearer to a current time, on the assumption that a steering operation is smoothly conducted. Then, the controller calculates a difference between this estimate value and a detection value of the current steering operation, i.e., calculates an estimation error. At subsequent step S6, the controller calculates a frequency distribution of the estimation error for each of the two different predetermined durations TL1 and TL2. For example, this frequency distribution is formed by calculating frequencies of small zones m1 to m9 by assigning each new estimation error to one of the zones m1 to m9 in accordance with a magnitude of the new estimation error. The zones m1 to m9 are given by dividing an entire zone. A value α defining a width of each zone is set by using an average value of general driver.

The frequency distribution is updated at every obtainment of new data of the estimation error (i.e., is updated whenever a new data of the estimation error is measured). At first, a frequency pi of a small zone mi within which the new data falls (i.e., a small zone mi to which the new data corresponds) is calculated by the following formula (5).

$$pi=(pi+1/Np) \div (1+1/Np) \qquad (5)$$

wherein, Np denotes the total number of samples.

Moreover, a frequency pi of a small zone mi within which the new data does not fall (i.e., a small zone mi to which the new data does not correspond) is calculated by the following formula (6).

$$pi=pi \div (1+1/Np) \qquad (6)$$

At subsequent step S7, the controller calculates a steering entropy RHp on the basis of the two frequency distributions of estimation error. This steering entropy RHp is a value obtainable by quantifying an instability of the steering operation. This steering entropy RHp is defined as a non-steady-state degree DDs representing a degree at which the current driving-behavior pattern is different from the usual driving-behavior pattern (normal driving behavior). That is, the non-steady-state degree DDs represents how different the current driving-behavior pattern is as compared with the usual behavior. At first, the steering entropy RHp is calculated as shown in the following formula (7).

$$RHp = \Sigma qi \cdot \log_9(qi/pi) \qquad (7)$$

Wherein, pi denotes the distribution of estimation error in the predetermined duration TL1, and qi denotes the distribution of estimation error in the predetermined duration TL2. An estimation-error distribution data of average driver is set as initial values of the two frequency distributions. Then, as shown in the following formula (8), the steering entropy RHp is regarded as the non-steady-state degree DDs.

$$DDs=RHp \qquad (8)$$

At subsequent step S8, the controller calculates a learning level (learning percentage) PL of the driving-behavior pattern which differs from one drive to another driver, by any one of the following three methods ① to ③.

① Calculate Learning Level PL in Accordance with Data Acquisition Rate pm

At first, as shown in the following formula (9), the controller calculates a data acquisition rate (percentage) pm on the basis of the total number of samples and the number of data (measured data) already acquired as the driving-behavior pattern of driver. This total number of samples is the number of samples to be measured over the predetermined duration TL1 needed to grasp the usual driving-behavior pattern. In this embodiment, the data acquired from the driver means the above-mentioned frequency distribution of inter-vehicle time THW or the frequency distribution of estimation error, namely, the driving-behavior pattern of driver.

$$pm=m/(TL1 \times sr) \qquad (9)$$

wherein, sr denotes a sampling frequency.

Figure 5:
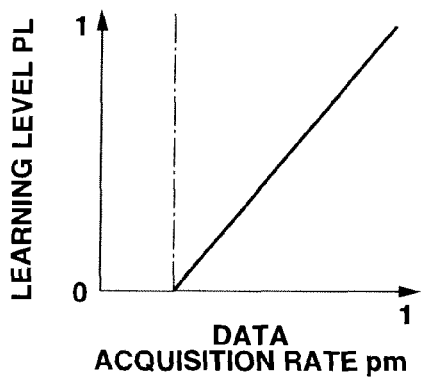
FIG. 5 A map that is used for calculating a learning level PL.

Then, the controller calculates the learning level PL of driving-behavior pattern in accordance with the data acquisition rate pm, referring to a map of FIG. 5. The map of FIG. 5 has a lateral axis taken as the data acquisition rate pm, and a vertical axis taken as the learning level PL. In the map of FIG. 5, the learning level PL is set to become larger as the data acquisition rate pm becomes larger.

② Calculate Learning Level PL in Accordance with Time Lapse Rate pt

At first, as shown in the following formula (10), the controller calculates a time lapse rate (percentage) pt on the basis of the predetermined duration TL1 needed to grasp the usual driving-behavior pattern, and on the basis of a lapse time mt elapsed from a time point when the data acquisition related to the driving-behavior pattern of driver was started.

$$pt=mt/TL1 \qquad (10)$$

Figure 6:
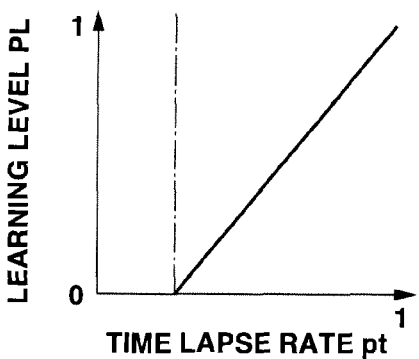
FIG. 6 A map that is used for calculating the learning level PL.

Then, the controller calculates the learning level PL of driving-behavior pattern in accordance with the time lapse rate pt, referring to a map of FIG. 6. The map of FIG. 6 has a lateral axis taken as the time lapse rate pt and a vertical axis taken as the learning level PL. In the map of FIG. 6, the learning level PL is set to become larger as the time lapse rate pt becomes larger.

③ Combine the Above Method ① with the Above method ②

For example, the controller calculates an average value of the results of methods ① and ②, or selects lower one of the results of methods ① and ②. Alternatively, the controller may assign weights to the results of methods ① and ②, and sum the weighted results.

At subsequent step S9, the controller judges whether or not the non-steady-state degree DDf is larger than a predetermined threshold value Sfo. Also, the controller judges whether or not the non-steady-state degree DDs is larger than a predetermined threshold value Sso. If a result of this judgment satisfies both relations of DDf≤Sfo and DDs≤Sso, the controller determines that the current driving-behavior pattern is generated as usual, i.e., is near the usual driving-behavior pattern. Then, the program returns to a predetermined main flow. On the other hand, if the judgment result of step S9 satisfies a relation of DDf>Sfo or satisfies a relation of DDs>Sso, the controller determines that the current driving-behavior pattern is greatly different from the usual time, i.e., is greatly different as compared with the usual driving-behavior pattern. Then, the program proceeds to step S10.

At step S10, the controller sets an information provision level according to the learning level PL, referring to a table of FIG. 7. This information provision level is used when providing the maneuver assisting information to the driver. In the table of FIG. 7, the information provision level is set at L0 when the learning level PL is between 0 and a predetermined value C1 (0≤PL<C1). Moreover, the information provision level is set at L1 when the learning level PL is between the predetermined value C1 and a predetermined value C2 (C1≤PL<C2). Moreover, the information provision level is set at L2 when the learning level PL is between the predetermined value C2 and 1 (C2≤PL<1). Moreover, the information provision level is set at L3 when the learning level PL is equal to 1 (PL=1). That is, in the table of FIG. 7, the information provision level becomes larger as the learning level PL becomes larger.

At subsequent step S11, the controller determines the maneuver assisting information according to the judgment result of step S9 and the information provision level. Then, the controller provides (outputs) this maneuver assisting information through the display unit 50 and the speaker 60 to the driver. Then, the program returns to the predetermined main flow. At first, if the judgment result of step S9 satisfies the relation of DDf>Sfo, the controller provides the maneuver assisting information for the inter-vehicle time THW. Hence, the controller determines the maneuver assisting information according to the information provision level, referring to the table of FIG. 8. According to the table of FIG. 8, any information is not provided when the information provision level is equal to L0. When the information provision level is equal to L1, the driver is notified (informed) of the attention contents. At this time, for example, "PAY ATTENTION TO PRECEDING VEHICLE" is displayed or sounded for the driver. When the information provision level is equal to L2, the driver is notified of a fact related to a running state of host vehicle. At this time, for example, "INTER-VEHICLE DISTANCE IS SHORTER THAN USUAL" is displayed or sounded for the driver. When the information provision level is equal to L3, the driver is notified of the fact related to the running state of host vehicle while being advised of a caution. At this time, for example, "INTER-VEHICLE DISTANCE IS SHORTER THAN USUAL. DRIVE WITH CAUTION." is displayed or sounded for the driver.

Moreover, if the judgment result of step S9 satisfies the relation of DDs>Sso, the controller provides the maneuver assisting information for the steering operation. Hence, the controller determines the maneuver assisting information according to the information provision level, referring to a table of FIG. 9. According to the table of FIG. 9, any information is not provided when the information provision level is equal to L0. When the information provision level is equal to L1, the driver is notified of attention contents. At this time, for example, "PAY ATTENTION TO WOBBLE" is displayed or sounded for the driver. When the information provision level is equal to L2, the driver is notified of a fact related to the running state of host vehicle. At this time, for example, "STEERING OPERATION IS ROUGHER THAN USUAL" is displayed or sounded for the driver. When the information provision level is equal to L3, the driver is notified of a fact related to the running state of host vehicle while being advised of a caution. At this time, for example, "STEERING OPERATION IS ROUGHER THAN USUAL. DRIVE WITH CAUTION." is displayed or sounded for the driver.

Operation

At first, the usual driving-behavior pattern of driver is learned in advance. By using this, a necessary maneuver assisting information is given to the driver when the current driving-behavior pattern is different from usual. In this embodiment, as the driving-behavior pattern of driver, the frequency distribution of inter-vehicle time THW is used. That is, a habit related to the inter-vehicle distance and the relative speed between the host vehicle and the preceding vehicle, in other words, a way to have a distance to the preceding vehicle and to approach the preceding vehicle is learned as the frequency distribution of inter-vehicle time THW (steps S2 and S3). Moreover in this embodiment, a habit related to the steering operation, in other words, a smoothness of the steering operation is learned as the frequency distribution of estimation error (steps S5 and S6). The usual driving-behavior pattern is grasped based on the sample data measured for the predetermined duration TL1 which has a certain level of length. On the other hand, the current driving-behavior pattern is grasped based on the sample data measured for the predetermined duration TL2 which is a latest short time length.

Then, in order to judge how different the current driving-behavior pattern is as compared with the usual behavior, the non-steady-state degree DDf is calculated based on the frequency distribution of inter-vehicle time THW, by using the above formula (4) (step S4). Moreover, the non-steady-state degree DDs is calculated based on the frequency distribution of estimation error, by using the above formulas (7) and (8) (step S7). If the non-steady-state degree DDf exceeds the threshold value Sfo (judgment of step S9 is "YES"), it is determined that the current driving-behavior pattern related to the inter-vehicle distance to the preceding vehicle and the relative speed to the preceding vehicle is different from the usual. Thereby, the maneuver assisting information for raising an attention about the preceding vehicle is provided (step S11). Moreover, if the non-steady-state degree DDs exceeds the threshold value Sso (judgment of step S9 is "YES"), it is determined that the current driving-behavior pattern related to the steering operation is different from the usual. Thereby, the maneuver assisting information for raising an attention about the steering operation is provided (step S11).

Since the number of data is insufficient during the process of learning the driving-behavior pattern, the data (initial values) of average driver has to be used as a substitute for this shortage amount of data. Hence, there is a possibility that a judgment accuracy for the non-steady-state degree DDf and the non-steady-state degree DDs becomes low so that a strangeness feeling is given to the driver due to an improper maneuver assisting information. Therefore, in this embodiment, the learning level PL of the driving-behavior pattern is calculated based on at least one of the data acquisition rate pm and the time lapse rate pt (step S8), and the information provision level is set at one of L0 to L3 according to the learning level PL. Thereby, provision contents of the maneuver assisting information are varied (step S10). That is, since a possibility of providing an improper maneuver assisting information becomes higher as the learning level PL is lower, the provision contents of maneuver assisting information is more suppressed as the learning level PL is lower.

At first, when the information provision level is equal to L0, the learning level PL is in its lowest state, i.e., the controller is in a state immediately after a start of the learning. Hence, the provision of maneuver assisting information is withheld. When the information provision level is equal to L1, the learning level PL remains insufficient. Hence, only the attention contents such as "PAY ATTENTION TO PRECEDING VEHICLE" and "PAY ATTENTION TO WOBBLE" are provided. When the information provision level is equal to L2, the learning level PL has been elevated. Hence, the specific facts about the running state of vehicle such as "INTER-VEHICLE DISTANCE IS SHORTER THAN USUAL" and "STEERING OPERATION IS ROUGHER THAN USUAL" are provided. When the information provision level is equal to L3, the learning level PL is in its highest state, i.e., the controller has substantially completed the learning. Hence, the specific facts about the running state of vehicle are provided with the caution provision, such as "INTER-VEHICLE DISTANCE IS SHORTER THAN USUAL. DRIVE WITH CAUTION." and "STEERING OPERATION IS ROUGHER THAN USUAL. DRIVE WITH CAUTION.". Thus, the contents of maneuver assisting information are varied according to the learning level PL. Therefore, a proper maneuver assisting information can be given to the driver even if the driving-behavior pattern is in the process of being learned.

Other Application Examples

In the first embodiment, the habit about the inter-vehicle distance and the relative speed to the preceding vehicle is learned, and also the habit about the steering operation is learned. However, the structure according to the present invention is not limited to this. Any one of these two habits may be employed according to the present invention. Moreover, in the first embodiment, one example of the maneuver assisting information has been explained. However, the structure according to the present invention is not limited to this. The contents of maneuver assisting information may be changed to the other contents within teachings according to the present invention.

Advantageous Effects

From the above explanations, the processing of steps S2, S3, S5 and S6 corresponds to a "learning section or learning means" according to the present invention. Moreover, the processing of steps S4 and S7 corresponds to a "non-steady-state degree calculating section or means". The processing of step S8 corresponds to a "learning level calculating section or means". The processing of steps S9 to S11 corresponds to a "notifying section or means".

(1) The driving maneuver assisting apparatus in the first embodiment includes the learning section configured to learn the driving-behavior pattern of driver for the is predetermined duration; the non-steady-state degree calculating section configured to calculate the non-steady-state degree representing how different the current driving-behavior pattern is from the driving-behavior pattern learned by the learning section, by comparing the current driving-behavior pattern with the driving-behavior pattern learned by the learning section; the learning level calculating section configured to calculate the learning level of the learning section; and the notifying section configured to notify the driver of the maneuver assisting information for inducing the driving-behavior pattern learned by the learning section in accordance with the learning level calculated by the learning level calculating section, when the non-steady-state degree calculated by the non-steady-state degree calculating section exceeds the threshold value. Thereby, the maneuver assisting information is varied according to the learning level of driving-behavior pattern, when the learning section is in the middle of learning the driving-behavior pattern of driver. Therefore, an accurate maneuver assisting information can be provided to the driver.

(2) In the driving maneuver assisting apparatus according to the first embodiment, the learning level calculating section is configured to calculate the learning level of the learning section in accordance with the number of data already acquired as the driving-behavior pattern of the driver by the learning section. Accordingly, the learning level can be calculated easily and precisely.

(3) In the driving maneuver assisting apparatus according to the first embodiment, the learning level calculating section is configured to calculate the learning level of the learning section in accordance with the time elapsed from a time point when the learning section started to acquire the data as the driving-behavior pattern of the driver. Accordingly, the learning level can be calculated easily and precisely.

(4) In the driving maneuver assisting apparatus according to the first embodiment, the notifying section is configured to vary the contents of the maneuver assisting information in accordance with the learning level calculated by the learning level calculating section. Accordingly, the driver can be prevented from being informed of an inappropriate maneuver assisting information.

(5) In the driving maneuver assisting apparatus according to the first embodiment, the notifying section is configured to provide contents of the maneuver assisting information in more detail as the learning level calculated by the learning level calculating section becomes higher. Accordingly, the driver can be prevented from being informed of an inappropriate maneuver assisting information.

(6) In the driving maneuver assisting method according to the first embodiment, the driving-behavior pattern of driver is previously learned for the predetermined duration; the non-steady-state degree representing how different the current driving-behavior pattern is from the learned driving-behavior pattern is calculated by comparing the current driving-behavior pattern with the learned driving-behavior pattern; the driver is notified of the maneuver assisting information for leading the driver to the learned driving-behavior pattern, when the calculated non-steady-state degree exceeds the threshold value; and the maneuver assisting information is varied in accordance with the learning level, during a process of learning the driving-behavior pattern of the driver. Therefore, since the maneuver assisting information is varied according to the learning level of the driving-behavior pattern of driver in the middle of learning the driving-behavior pattern, an appropriate maneuver assisting information can be given to the driver.

Second Embodiment

Configuration

Figure 10:
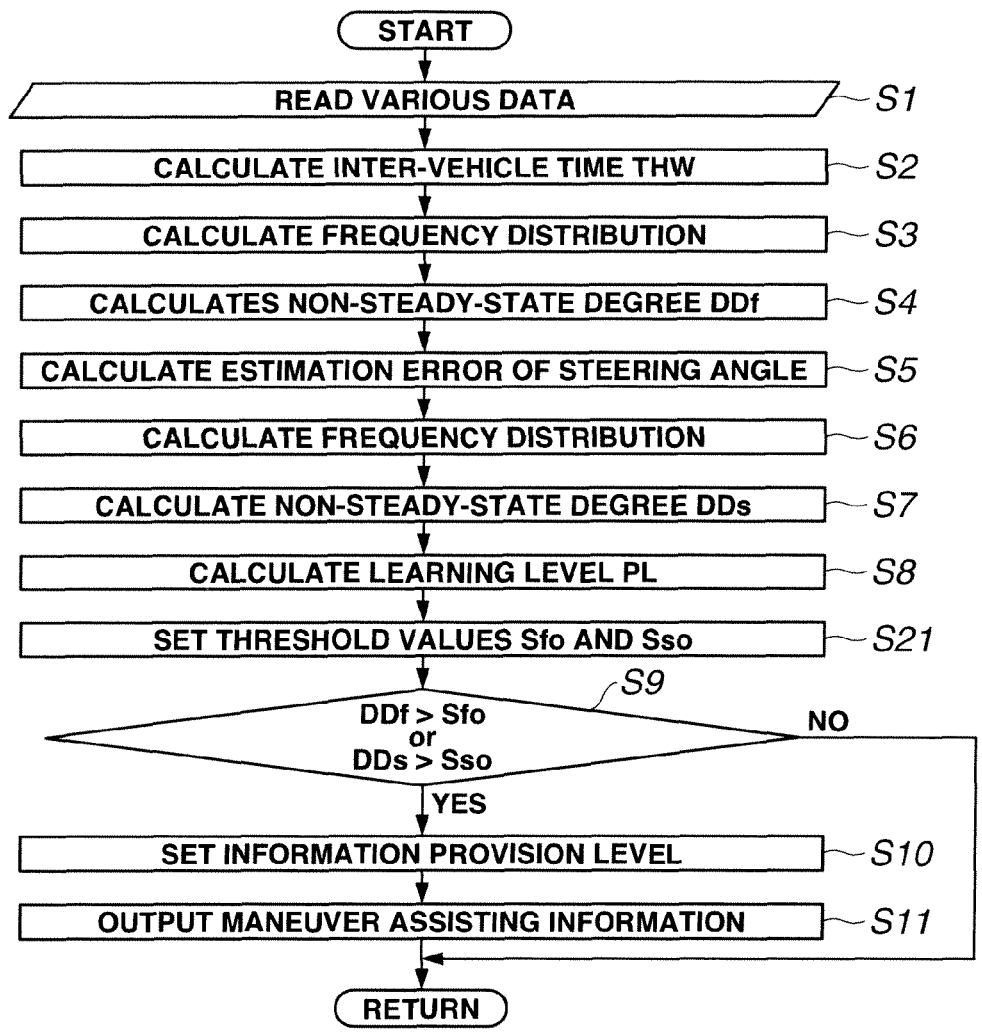
FIG. 10 A flowchart showing a maneuver assisting processing in a second embodiment.
Figure 11:
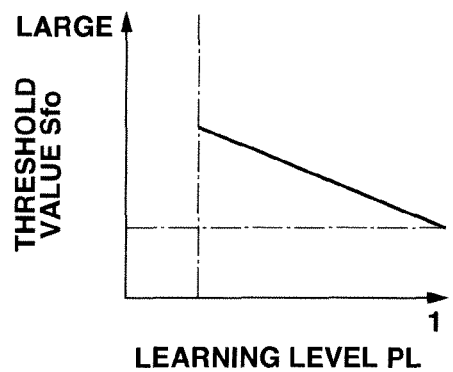
FIG. 11 A map that is used for calculating a threshold value Sfo.
Figure 12:
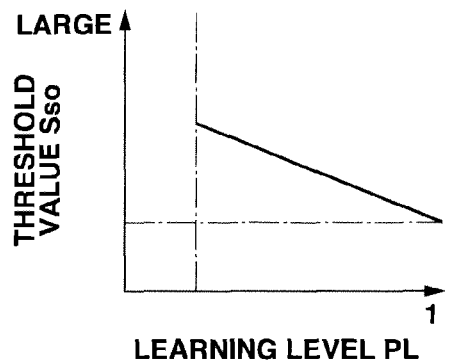
FIG. 12 A map that is used for calculating a threshold value Sso.

In a second embodiment according to the present invention, the threshold value Sfo and the threshold value Sso are varied according to the learning level PL. A maneuver assisting process of FIG. 10 is executed in the second embodiment. In the process of FIG. 10, a new step S21 is added and interposed between step S8 and step S9 of the flowchart in the above-explained first embodiment. At step S21 in the second embodiment, the controller calculates the threshold values Sfo and Sso in accordance with the learning level PL. At first, the controller calculates the threshold value Sfo in accordance with the learning level PL, referring to a map of FIG. 11. In the map of FIG. 11, the threshold value Sfo is set to become larger as the learning level PL becomes lower. Next, the controller calculates the threshold value Sso in accordance with the learning level PL, referring to a map of FIG. 12. In the map of FIG. 12, the threshold value Sso is set to become larger as the learning level PL becomes lower.

Operation

In the second embodiment, the threshold value Sfo and the threshold value Sso are made larger as the learning level PL becomes lower (step S21). Accordingly, it becomes more difficult for the non-steady-state degree DDf to exceed the threshold value Sfo, as the learning level PL is lower. Also, it becomes more difficult for the non-steady-state degree DDs to exceed the threshold value Sso, as the learning level PL is lower. Therefore, the provision of maneuver assisting information is suppressed when the learning level PL is relatively low. Thereby, the driver can be prevented from being notified of an inappropriate maneuver assisting information. The other operations and effects according to the second embodiment are similar as those of the first embodiment.

Advantageous Effects

According to the above explanations, the processing of step S21 corresponds to a "first varying section or means".

(1) The driving maneuver assisting apparatus according to the second embodiment further includes the first varying section configured to vary at least one of the threshold value and the non-steady-state degree so as to make it more difficult for the non-steady-state degree to exceed the threshold value as the learning level calculated by the learning level calculating section is lower. Thereby, so the provision of maneuver assisting information is suppressed when the learning level is low. Therefore, the driver can be prevented from being notified of an inadequate maneuver assisting information.

(2) In the driving maneuver assisting apparatus according to the second embodiment, the first varying section is configured to increase the threshold value more as the learning level calculated by the learning level calculating section is lower. Thereby, the provision of maneuver assisting information is suppressed when the learning level is low. Therefore, the driver can be prevented from being notified of an inadequate maneuver assisting information.

Third Embodiment

Configuration

Figure 13:
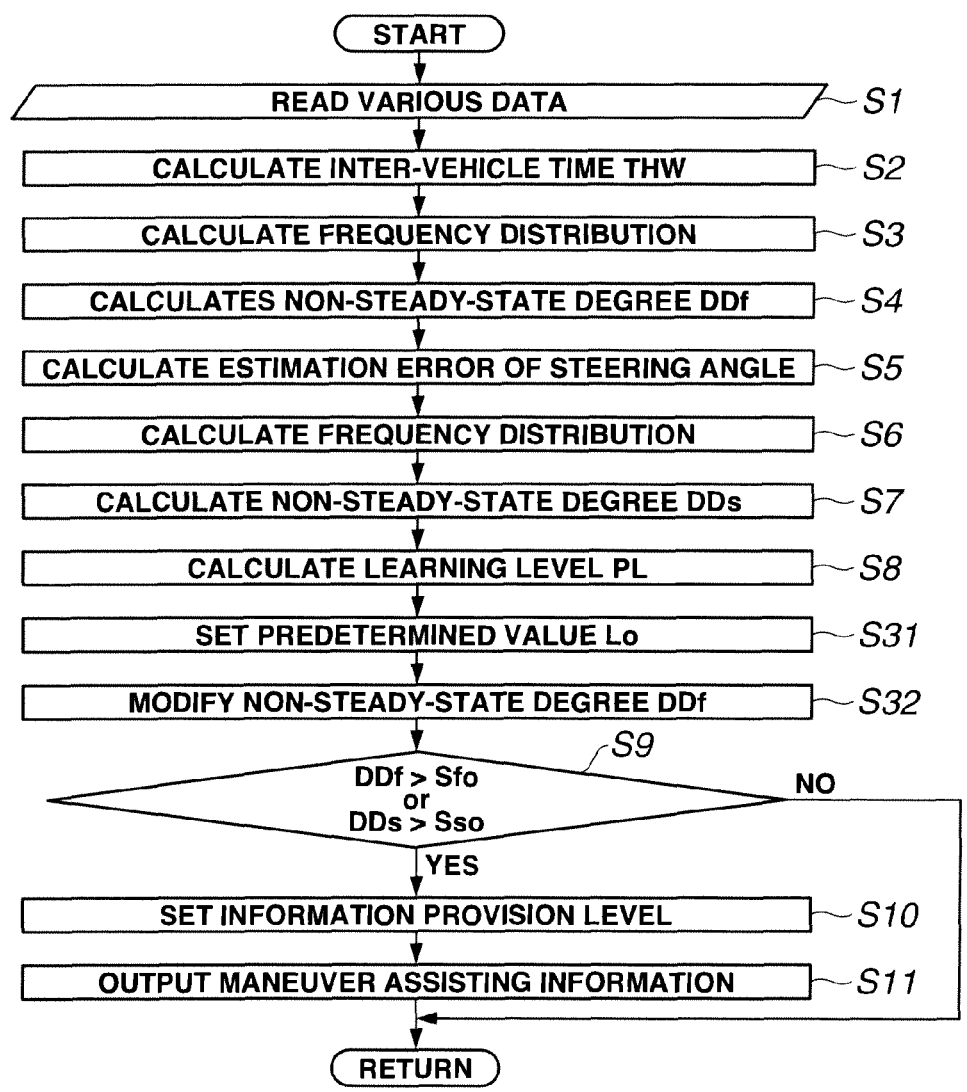
FIG. 13 A flowchart showing a maneuver assisting processing in a third embodiment.
Figure 14:
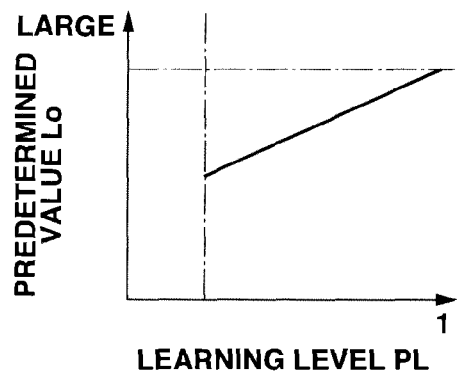
FIG. 14 A map that is used for calculating a predetermined value Lo.

In a third embodiment according to the present invention, the predetermined value Lo is varied according to the learning level PL. A maneuver assisting process of FIG. 13 is executed in the third embodiment. In the process of FIG. 13, new steps S31 and S32 are added and interposed between step S8 and step S9 of the flowchart in the above-explained first embodiment. At step S31 in the third embodiment, the controller calculates the predetermined value Lo in accordance with the learning level PL, referring to a map of FIG. 14. In the map of FIG. 14, the predetermined value Lo is set to become smaller as the learning level PL is lower. At step S32, the controller conducts the processing of step S4 again by use of the predetermined value Lo set at step S31. That is, at step S32, the controller modifies the non-steady-state degree DDf by using the predetermined value Lo set at step S31.

Operation

In the third embodiment, the predetermined value Lo is made smaller as the learning level PL becomes lower (step S31). Accordingly, as the learning level PL is lower, the difference between the cumulative frequency S1 and the cumulative frequency S2 becomes smaller (see FIG. 4) to reduce the non-steady-state degree DDf (step S32). That is, it is more difficult for the non-steady-state degree DDf to exceed the predetermined threshold value Sfo as the learning level PL is lower. Therefore, the provision of maneuver assisting information is suppressed when the learning level PL is relatively low. Thereby, the driver can be prevented from being notified of an inappropriate maneuver assisting information. The other operations and effects according to the third embodiment are similar as those of the first embodiment.

Other Application Examples

In the third embodiment, the non-steady-state degree DDf is corrected by varying the predetermined value Lo in accordance with the learning level PL. However, the structure according to the present invention is not limited to this. The non-steady-state degree DDf may be directly corrected by multiplying the non-steady-state degree DDf by a correction factor k. In such a case, the correction factor k is given to become smaller from 1 as the learning level PL becomes lower.

Advantageous Effects

According to the above explanations, the processing of steps S31 and S32 corresponds to the "first varying section or means".

(1) The driving maneuver assisting apparatus according to the third embodiment further includes the first varying section configured to vary at least one of the threshold value and the non-steady-state degree so as to make it more difficult for the non-steady-state degree to exceed the threshold value as the learning level calculated by the learning level calculating section is lower. Thereby, the provision of maneuver assisting information is suppressed when the learning level is low. Therefore, the driver can be prevented from being notified of an inadequate maneuver assisting information.

(2) In the driving maneuver assisting apparatus according to the third embodiment, the first varying section is configured to reduce the non-steady-state degree more as the learning level calculated by the learning level calculating section is lower. Thereby, the provision of maneuver assisting information is suppressed when the learning level is low. Therefore, the driver can be prevented from being notified of an inappropriate maneuver assisting information.

Fourth Embodiment

Configuration

Figure 15:
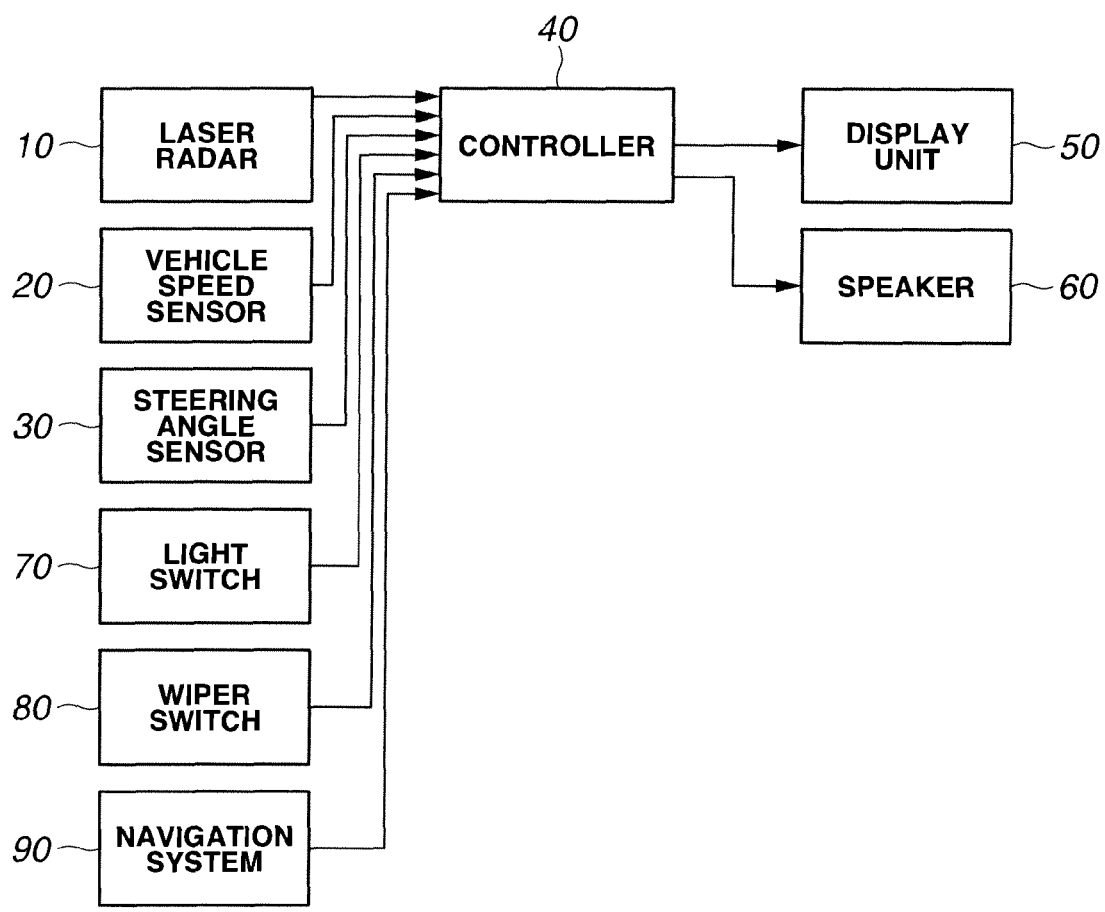
FIG. 15 A block diagram showing a system structure in a fourth embodiment.

In a fourth embodiment according to the present invention, a running environment around the host vehicle is detected, and then, the learning level PL is corrected according to the detected running environment. FIG. 15 is a view showing a system structure in the fourth embodiment. In the fourth embodiment, a light switch 70, a wiper switch 80 and a navigation system 90 are added to the system structure of the first embodiment. The navigation system 90 receives a traffic information of surrounding area of the vehicle through a FM multiplex broadcasting or a radio/optical beacon, from a road traffic information communication system (VICS: Vehicle Information and Communication System in Japan).

FIG. 16 is a view showing a maneuver assisting process in the fourth embodiment. In the fourth embodiment, a new steps S41 and S42 are added and interposed between the step S8 and step S9 of the flowchart in the above-explained first embodiment. At step S41, an environmental flag F is set according to a current running environment. At first, the controller detects a brightness (luminosity) around the vehicle in accordance with an operating state of the light switch 70. As shown in FIG. 17, if the light switch 70 is in OFF state, the controller determines that the brightness around the vehicle is within a standard environment so that the controller resets the environmental flag F to 0 (F=0). On the other hand, if the light switch 70 is in ON state, the controller determines that the brightness around the vehicle is out of the standard environment so that the controller sets the environmental flag F to 1 (F=1).

Moreover, the controller detects a weather state around the vehicle in accordance with an operating state of the wiper switch 80. As shown in FIG. 18, if the wiper switch 80 is in OFF state, the controller determines that the weather state is within the standard environment so that the controller resets the environmental flag F to 0 (F=0). On the other hand, if the wiper switch 80 is in ON state, the controller determines that the weather state is out of the standard environment so that the controller sets the environmental flag F to 1 (F=1). Moreover, the controller detects a traffic volume around the vehicle in accordance with the traffic information. As shown in FIG. 19, if the traffic volume is low, the controller determines that the traffic volume is within the standard environment so that the controller resets the environmental flag F to 0 (F=0). On the other hand, if the traffic volume is high, the controller determines that the traffic volume is out of the standard environment so that the controller sets the environmental flag F to 1 (F=1).

At a subsequent step S42, the controller corrects the learning level PL in accordance with the environmental flag F. In the case that the learning level PL is calculated according the data acquisition rate pm, the controller corrects the learning level PL in accordance with the environmental flag F referring to a map of FIG. 20. In the map of FIG. 20, the learning level PL becomes larger as the data acquisition rate pm is higher. Also in this map, a value of the learning level PL which is obtained when the environmental flag F is equal to 1 is smaller than that when the environmental flag F is equal to 0. On the other hand, in the case that the learning level PL is calculated according the time lapse rate pt, the controller corrects the learning level PL in accordance with the environmental flag F referring to a map of FIG. 21. In the map of FIG. 21, the learning level PL becomes larger as the time lapse rate pt becomes higher. Also in this map, a value of the learning level PL which is obtained when the environmental flag F is equal to 1 is smaller than that when the environmental flag F is equal to 0.

Operation

In the fourth embodiment, the current running environment is detected (step S41), and then, the learning level PL is made small if the detected running environment is different from the predetermined standard environment (step S42). Accordingly, the information provision level is reduced to moderate the provision contents of the maneuver assisting information. That is, since the driving-behavior pattern of driver when the running environment is not normal (not standard) such as at the time of night, at the time of bad weather and at the time of traffic jam has a high tendency to differ from the usual driving-behavior pattern; an unnecessary notification of maneuver assisting information is suppressed. Therefore, the driver can be prevented from having a strangeness feeling. The other operations and effects according to the fourth embodiment are similar as those of the first embodiment.

Other Application Examples

In the fourth embodiment, the brightness around the vehicle is detected according to the operating state of light switch 70. However, the structure according to the present invention is not limited to this. The brightness around the vehicle may be detected by a light-receiving sensor for sensing an illuminance outside the vehicle. Moreover, in the fourth embodiment, the weather state around the vehicle is detected according to the operating state of wiper switch 80. However, the structure according to the present invention is not limited to this. The weather state around the vehicle may be detected by a rain (raindrop) sensor. Alternatively, the weather state around the vehicle may be detected according to an operating state of fog lamp, an operating state of defogger (defroster) and the like. This fog lamp is used under a low view range (low visibility) due to fog and the like, because light of the fog lamp reaches more widely than a headlamp and hence is superior in visibility from oncoming vehicle and pedestrian. The defogger evaporates fogging and dew of inner surface of window glass by blowing dry-warm air from an air conditioner to the window glass, or melts frost and ice attached to an outside of the window glass by passing electric current through a resistor wire routed in the window glass and thereby warming the glass. Moreover, in the fourth embodiment, the brightness, the weather state and the traffic volume are detected as the running environment of surrounding area of the vehicle. However, the structure according to the present invention is not limited to this. At least one of the brightness, the weather state and the traffic volume may be detected.

Advantageous Effects

According to the above explanations, the processing of step S41 corresponds to a "judging section or means", and the processing of step S42 corresponds to a "second varying section or means".

(1) The driving maneuver assisting apparatus according to the fourth embodiment further includes the judging section configured to detect the current running environment around the vehicle and to judge whether or not the detected current running environment differs from the predetermined standard environment; and the second varying section configured to decrease the learning level calculated by the learning level calculating section when the judging section determines that the current running environment differs from the predetermined standard environment. Accordingly, an unnecessary provision of maneuver assisting information is suppressed when the running environment is not normal. Hence, the driver can be prevented from having a strangeness feeling.

(2) In the driving maneuver assisting apparatus according to the fourth embodiment, the judging section is configured to detect the current brightness around the vehicle, and to determine that the current running environment differs from the predetermined standard environment when the detected current brightness is lower than the predetermined standard state. Accordingly, it can be appropriately judged whether or not the current running environment is different from the predetermined standard environment, on the basis of whether daytime or nighttime.

(3) In the driving maneuver assisting apparatus according to the fourth embodiment, the judging section is configured to detect the current weather state around the vehicle, and to determine that the current running environment differs from the predetermined standard environment when the detected current weather state is worse than its predetermined standard state. Accordingly, it can be appropriately judged whether or not the current running environment is different from the predetermined standard environment, on the basis of whether good weather or bad weather.

(4) In the driving maneuver assisting apparatus according to the fourth embodiment, the judging section is configured to detect the current traffic volume around the vehicle, and to determine that the current running environment differs from the predetermined standard environment when the detected current traffic volume is higher than its predetermined standard state. Accordingly, it can be appropriately judged whether or not the current running environment is different from the predetermined standard environment, on the basis of whether high traffic volume or low traffic volume.

Fifth Embodiment

Configuration

Figure 22:
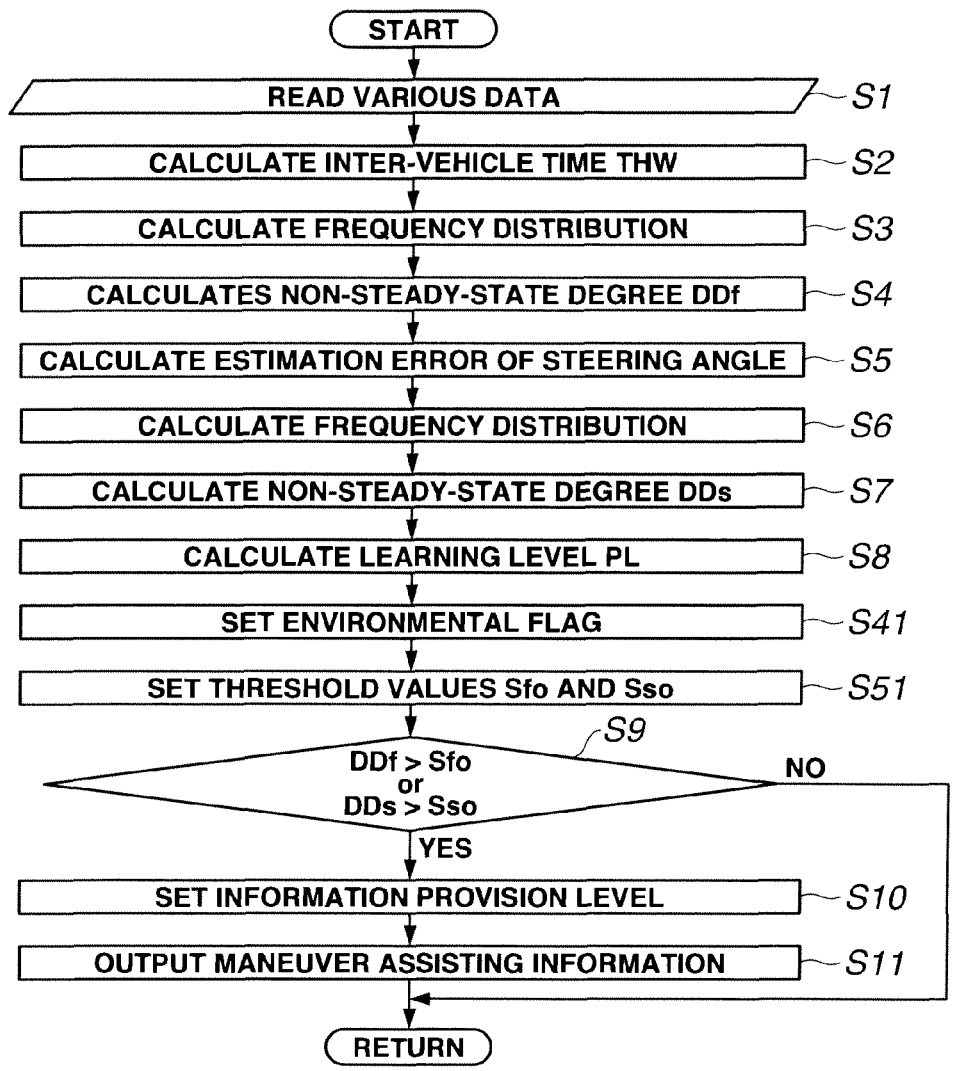
FIG. 22 A flowchart showing a maneuver assisting processing in a fifth embodiment.

In a fifth embodiment according to the present invention, the running environment around the vehicle is detected, and the threshold values Sfo and Sso are varied according to the detected running environment. A maneuver assisting process of FIG. 22 is executed in the fifth embodiment. In the process of FIG. 22, the processing of step S42 in the above-explained fourth embodiment has been changed to a new step S51. At step S51, the threshold values Sfo and Sso are calculated in dependence upon the learning level PL and the environmental flag F.

Figure 23:
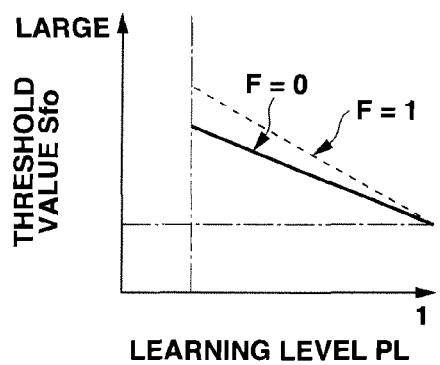
FIG. 23 A map that is used for calculating the threshold value Sfo.
Figure 24:
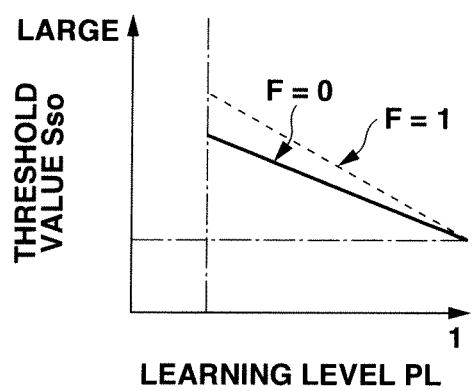
FIG. 24 A map that is used for calculating the threshold value Sso.

At first, the controller calculates the threshold value Sfo in accordance with the learning level PL and the environmental flag F, referring to a map of FIG. 23. In the map of FIG. 23, the threshold value Sfo becomes larger as the learning level PL becomes lower. Also in this map, a value of the threshold value Sfo which is obtained when the environmental flag F is equal to 1 is larger than that when the environmental flag F is equal to 0. Next, the controller calculates the threshold value Sso in accordance with the learning level PL and the environmental flag F, referring to is a map of FIG. 24. In the map of FIG. 24, the threshold value Sso becomes larger as the learning level PL becomes lower. Also in this map, a value of the threshold value Sso which is obtained when the environmental flag F is equal to 1 is larger than that when the environmental flag F is equal to 0.

Operation

In the fifth embodiment, the current running environment is detected (step S41), and then, the threshold values Sfo and Sso are made large if the detected running environment is different from the predetermined standard environment (step S51). Thereby, it becomes difficult for the non-steady-state degree DDf to exceed the threshold value Sfo, and also it becomes difficult for the non-steady-state degree DDs to exceed the threshold value Sso. That is, since the driving-behavior pattern of driver when the running environment is not normal (not standard) such as at the time of night, at the time of bad weather and at the time of traffic jam has a high tendency to differ from the usual driving-behavior pattern; an unnecessary notification of the maneuver assisting information is suppressed. Therefore, the driver can be prevented from having a strangeness feeling. The other operations and effects according to the fifth embodiment are similar as those of the fourth embodiment.

Advantageous Effects

According to the above explanations, the processing of step S41 corresponds to the "judging section or means", and the processing of step S51 corresponds to a "third varying section or means".

(1) The driving maneuver assisting apparatus according to the fifth embodiment further includes the judging section configured to detect the current running environment around the vehicle and to judge whether or not the detected current running environment differs from the predetermined standard environment; and the third varying section configured to vary at least one of the threshold value and the non-steady-state degree so as to make it difficult for the non-steady-state degree to exceed the threshold value, when the judging section determines that the current running environment differs from the predetermined standard environment. Accordingly, the provision of unnecessary maneuver assisting information is suppressed when the running environment is not in the normal state. Therefore, the driver can be prevented from having an uncomfortable feeling.

Sixth Embodiment

Configuration

Figure 25:
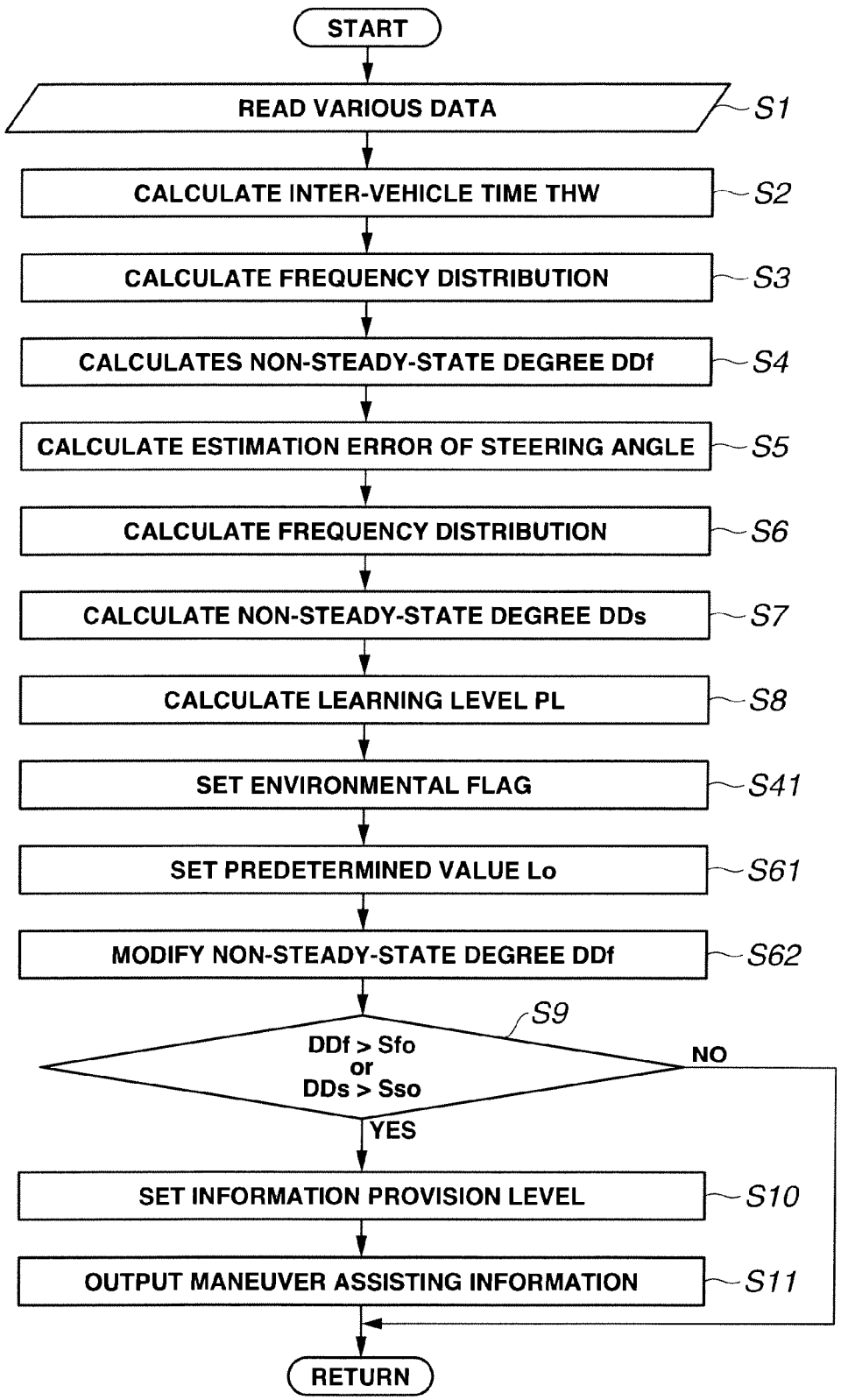
FIG. 25 A flowchart showing a maneuver assisting processing in a sixth embodiment.
Figure 26:
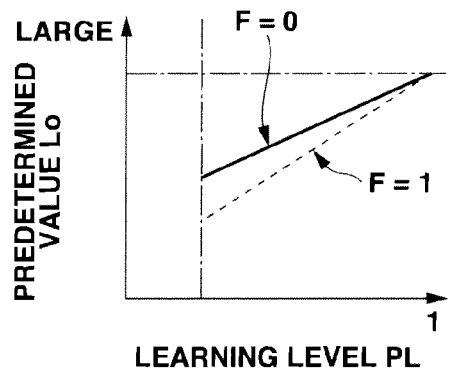
FIG. 26 A map that is used for calculating the predetermined value Lo.

In a sixth embodiment according to the present invention, the running environment around vehicle is detected, and the predetermined value Lo is varied according to the detected running environment. A maneuver assisting process of FIG. 25 is executed in the sixth embodiment. In the process of FIG. 25, the processing of step S42 in the above-explained fourth embodiment has been changed to new steps S61 and S62. At step S61, the controller calculates the predetermined value Lo in dependence upon the learning level PL and the environmental flag F, referring to a map of FIG. 26. In the map of FIG. 26, the predetermined value Lo becomes smaller as the learning level PL becomes lower. Also in this map, a value of the predetermined value Lo which is obtained when the environmental flag F is equal to 1 is smaller than that when the environmental flag F is equal to 0. At step S62, the controller corrects the non-steady-state degree DDf by using the predetermined value Lo set at step S61, i.e., conducts the processing of step S4 again.

Operation

In the sixth embodiment, the current running environment is detected (step S41), and then, the predetermined value Lo is made smaller if the detected running environment is different from the predetermined standard environment (step S61). Thereby, the difference between the cumulative frequency S1 and the cumulative frequency S2 becomes smaller (see FIG. 4) so that the non-steady-state degree DDf becomes smaller (step S62). Thereby, it becomes difficult for the non-steady-state degree DDf to exceed the threshold value Sfo. That is, since the driving-behavior pattern of driver when the running environment is not normal such as at the time of night, at the time of bad weather and at the time of traffic jam has a high tendency to differ from the usual driving-behavior pattern; an unnecessary notification of the maneuver assisting information is suppressed. Therefore, the driver can be prevented from having a strangeness feeling. The other operations and effects according to the sixth embodiment are similar as those of the fourth embodiment.

Advantageous Effects

According to the above explanations, the processing of step S41 corresponds to the "judging section or means", and the processing of steps S61 and S62 corresponds to the "third varying section or means".

(1) The driving maneuver assisting apparatus according to the sixth embodiment further includes the judging section configured to detect the current running environment around the vehicle and to judge whether or not the detected current running environment differs from the predetermined standard environment; and the third varying section configured to vary at least one of the threshold value and the non-steady-state degree so as to make it difficult for the non-steady-state degree to exceed the threshold value, when the judging section determines that the current running environment differs from the predetermined standard environment. Accordingly, the provision of unnecessary maneuver assisting information is suppressed when the running environment is not in the normal state. Therefore, the driver can be prevented from having an uncomfortable feeling.

Seventh Embodiment

Configuration

Figure 27:
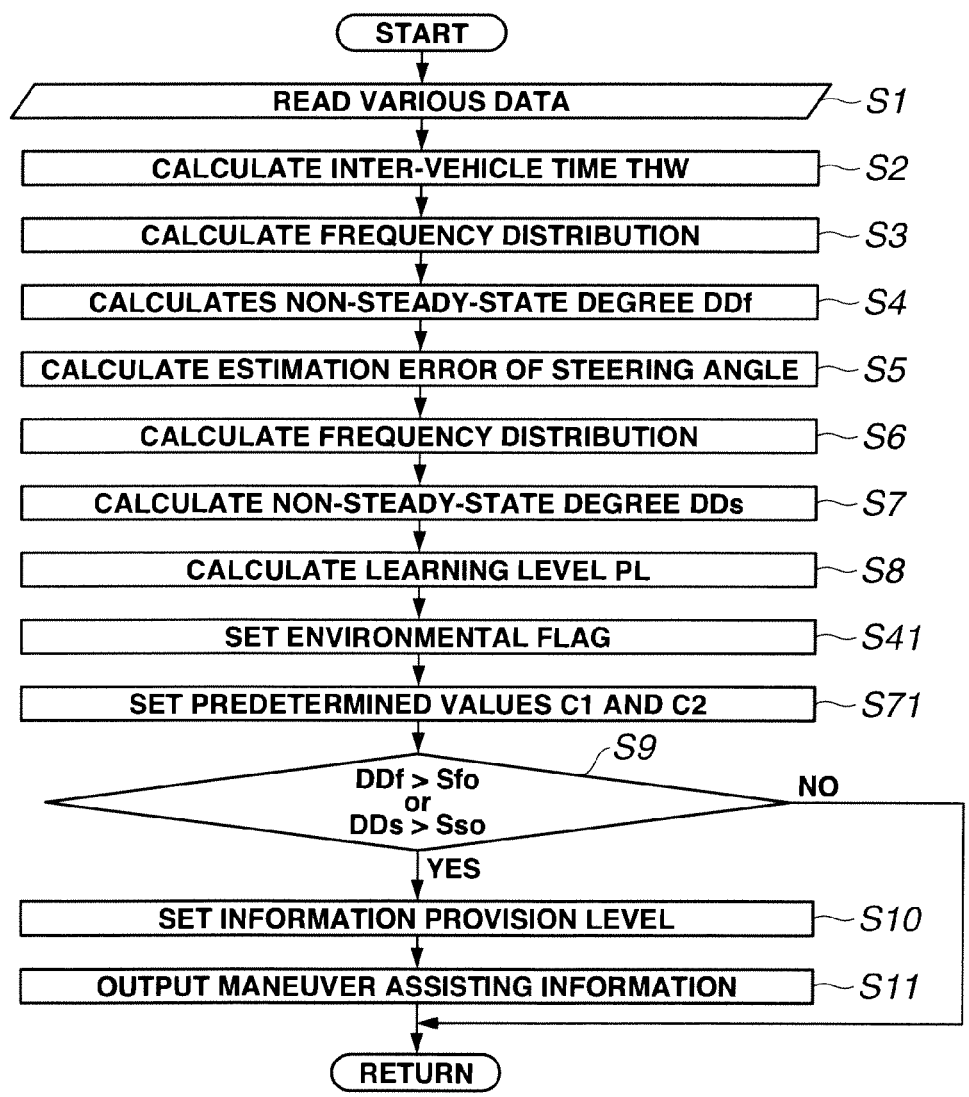
FIG. 27 A flowchart showing a maneuver assisting processing in a seventh embodiment.
Figure 28:
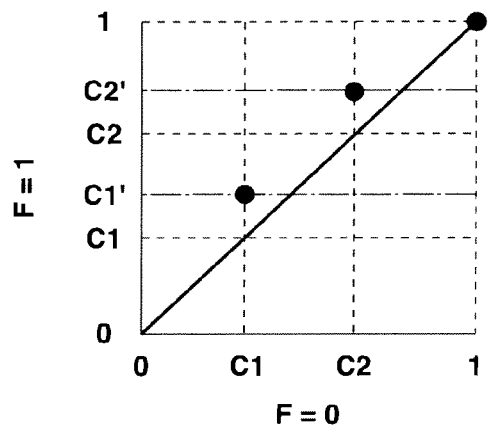
FIG. 28 A map that is used for calculating predetermined values C1 and C2.

In a seventh embodiment according to the present invention, the running environment around vehicle is detected, and the provision contents of maneuver assisting information are varied according to the detected running environment. A maneuver assisting process of FIG. 27 is executed in the seventh embodiment. In the process of FIG. 27, the processing of step S42 in the above-explained fourth embodiment has been changed to new step S71. At step S71, the controller calculates the predetermined values C1 and C2 in dependence upon the environmental flag F, referring to a map of FIG. 27. These predetermined values C1 and C2 are used at step S10. As shown by the map of FIG. 27, the predetermined values C1 and C2 are not changed (maintained) when the environmental flag F is equal to 0 (F=0), on the other hand, the predetermined values C1 and C2 are changed respectively to predetermined values C1' and C2' when the environmental flag F is equal to 1 (F=1). These predetermined values C1' and C2' are respectively larger than the predetermined values C1 and C2.

Operation

In the seventh embodiment, the current running environment is detected (step S41), and then, the predetermined values C1 and C2 are made larger if the detected running environment is different from the predetermined standard environment (step S71). Thereby, the information provision level is made smaller to moderate the provision contents of maneuver assisting information. That is, since the driving-behavior pattern of driver when the running environment is not normal such as at the time of night, at the time of bad weather and at the time of traffic jam has a high tendency to differ from the usual driving-behavior pattern; an unnecessary notification of the maneuver assisting information is suppressed. Therefore, to the driver can be prevented from having a strangeness feeling. The other operations and effects according to the seventh embodiment are similar as those of the fourth embodiment.

Advantageous Effects

According to the above explanations, the processing of step S41 corresponds to the "judging section or means", and the processing of steps S71 and S10 corresponds to the "notifying section or means".

(1) The driving maneuver assisting apparatus according to the seventh embodiment further includes the judging section configured to detect the current running environment around the vehicle and to judge whether or not the detected current running environment differs from the predetermined standard environment. Moreover, the notifying section is configured to suppress the provision of maneuver assisting information, when the judging section has determined that the current running environment differs from the predetermined standard environment. Accordingly, the provision of unnecessary maneuver assisting information is suppressed when the running environment is not in the normal state. Therefore, the driver can be prevented from having a strangeness feeling.

Eighth Embodiment

Configuration

Figure 29:
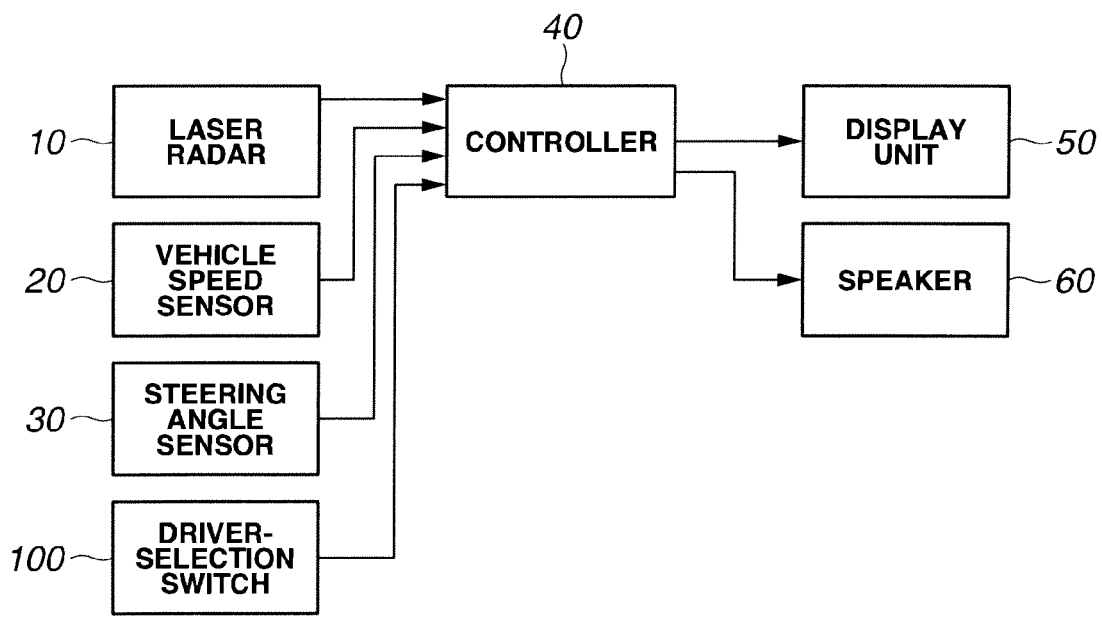
FIG. 29 A block diagram showing a system structure in an eighth embodiment.
Figure 30:
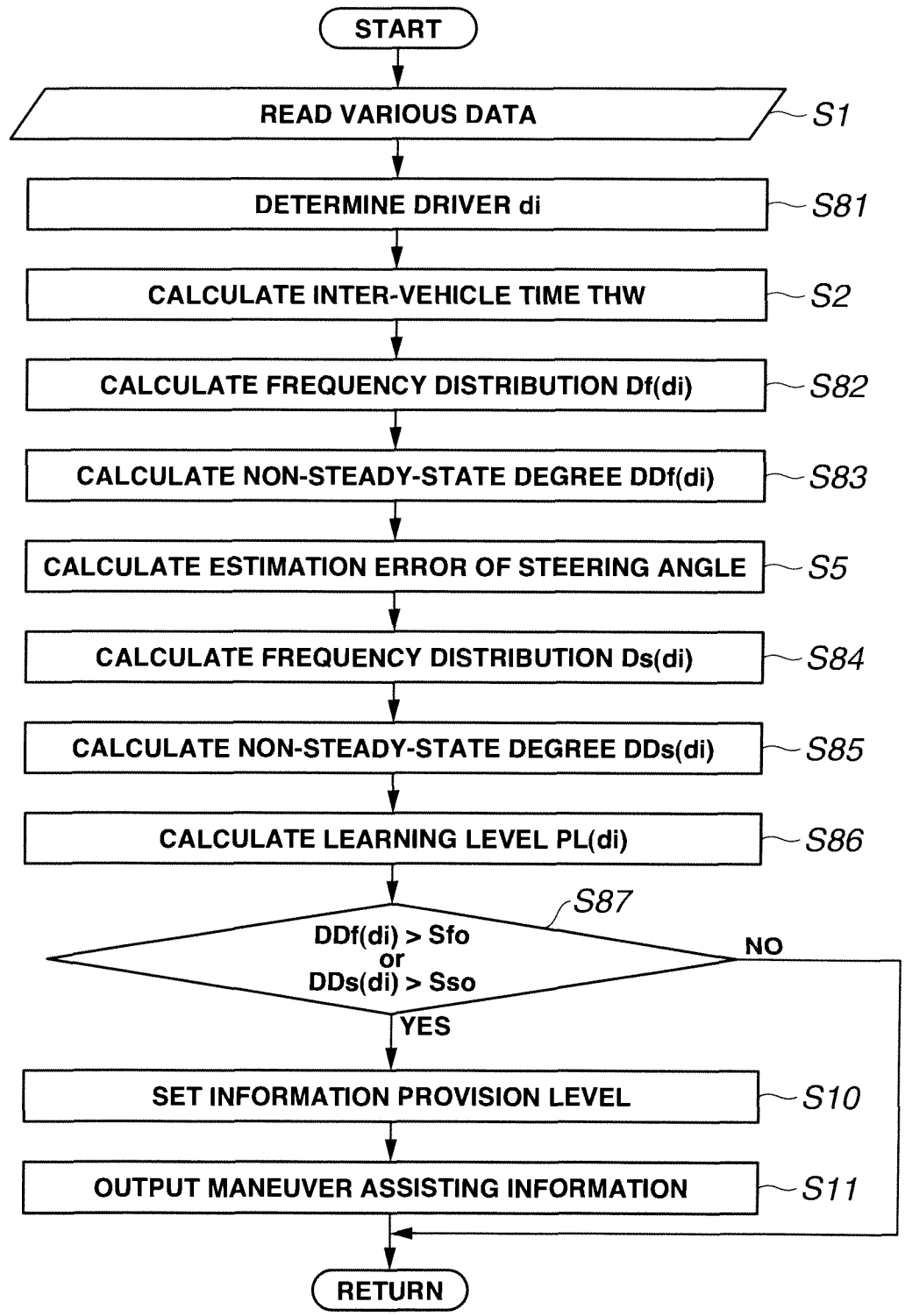
FIG. 30 A flowchart showing a maneuver assisting processing in the eighth embodiment.

In an eighth embodiment according to the present invention, the learning level is calculated for each driver individually, and a maneuver assisting information based on the calculated learning level is provided to the each driver. FIG. 29 is a block diagram of system configuration in the eighth embodiment. In the block diagram of FIG. 29, a driver-selection switch 100 is added to the system configuration of the above-explained first embodiment. For example, the driver-selection switch 100 is arranged in an instrument panel. When the driver selects a switch allocated to himself for calculating his frequency distributions and learning level, the controller 40 sets a data for the driver who has selected the switch. FIG. 30 is a flowchart showing a maneuver assisting process in the eighth embodiment. In the flowchart of FIG. 30; the processing of step S3 in the above-explained first embodiment has been changed to new step S82, the processing of step S4 in the first embodiment has been changed to new step S83, the processing of step S6 in the first embodiment has been changed to new step S84, the processing of step S7 in the first embodiment has been changed to new step S85, the processing of step S8 in the first embodiment has been changed to new step S86, and the processing of step S9 in the first embodiment has been changed to new step S87. Moreover in the flowchart of FIG. 30, step S81 for carrying out a driver determination is added to the flowchart of the first embodiment. In the flowchart of FIG. 30, di denotes a number (di: d1, □, di, □, dn) assigned to the driver who has been selected and set among the total number n of possible drivers. At first, at step S81, the controller determines (recognizes) the driver di. At step S82, the controller updates the inter-vehicle-time frequency distribution Df(di) of the determined driver di. At step S83, the controller calculates a non-steady-state degree DDf(di) of inter-vehicle time of the determined driver di. At step S84, the controller updates the estimation-error frequency distribution Ds(di) of steering angle of the determined driver di. At step S85, the controller calculates a non-steady-state degree DDs(di) of steering-angle estimation error of the determined driver di. At step S86, the controller updates a learning level PL(di) of the driver di. At step S87, the controller judges whether or not at least one of the non-steady-state degree DDf(di) and the non-steady-state degree DDs(di) calculated for the driver di is larger than a judgment threshold value. Then, at steps S10 and S11, the controller carries out a maneuver assistance. The data Df(di), DDf(di), Ds(di) and DDs(di) calculated at these steps is memorized and stored in a memory when the driver finishes the driving of vehicle or when another driver is set in place of the driver di by the driver-selection switch 100. Then, this stored data Df(di), DDf(di), Ds(di) and DDs(di) is set again when the same driver di is selected next time.

Operation

In the eighth embodiment, the frequency distributions are updated separately for each driver recognized (steps S81 and S83). Then, the non-steady-state degrees are calculated (steps S82 and S84), and the learning level is calculated (step S85). Accordingly, in a case that a plurality of drivers having driving frequencies different from one another (different frequencies in vehicle usage) share the maneuver assisting apparatus (share the vehicle), the maneuver assisting process is performed individually for each of the plurality of drivers. Accordingly, for example, when one driver uses the maneuver assisting apparatus for the first time after another driver has already increased the learning level, an unnecessary provision of the maneuver assisting information can be suppressed so as to prevent the one driver from having a strangeness feeling. Moreover, since the learning level at the time of previous driving is memorized and held, the maneuver assistance is executed at an early stage if the driving-behavior pattern becomes different from usual immediately after a next-time driving is started.

Advantageous Effects

According to the above explanations, the processing of step S81 corresponds to a "driver determining section or means", and the processing of steps S87 and S10 corresponds to the "notifying section or means".

The driving maneuver assisting apparatus according to the eighth embodiment further includes the means for determining a driver who is currently driving the vehicle. Moreover, the notifying section is configured to provide the maneuver assisting information according to the learning level attained for the determined current driver. Accordingly, even if one person which is currently driving the vehicle changes places with another person for which a learning level different from the one person has been attained (i.e., even at the time of driver change), an unnecessary provision of maneuver assisting information is suppressed so that the another driver can be prevented from having a strangeness feeling.

Other Application Examples

In the eighth embodiment, a remote entry key (key-less entry system) containing personally-identifying information, a driver-setting-number information of an auto-driving position system for maintaining seat position and steering-wheel position preset by each driver, or the like can be used as the means for determining (recognizing) the driver, instead of the above-mentioned driver-selection switch.

What is claimed is:

1. A driving maneuver assisting apparatus comprising: a learning section configured to learn a driving-behavior pattern of a driver for a predetermined duration; a non-steady-state degree calculating section configured to calculate a non-steady-state degree by comparing a current driving-behavior pattern with the driving-behavior pattern learned by the learning section, wherein the non-steady-state degree represents how different the current driving-behavior pattern is from the driving-behavior pattern learned by the learning section; a learning level calculating section configured to calculate a learning level of the learning section; and a notifying section configured to notify the driver of maneuver assisting information for inducing the driving-behavior pattern learned by the learning section in accordance with the learning level calculated by the learning level calculating section, when the non-steady-state degree calculated by the non-steady-state degree calculating section exceeds a threshold value, wherein the notifying section is configured to provide contents of the maneuver assisting information in more detail as the learning level calculated by the learning level calculating section becomes higher, and wherein the learning level calculating section is configured to calculate the learning level of the learning section in accordance with a number of data points already acquired as the driving-behavior pattern of the driver by the learning section.

2. The driving maneuver assisting apparatus as claimed in claim 1, wherein
the learning level calculating section is configured to calculate the learning level of the learning section in accordance with a time elapsed from a time point when the learning section started to acquire a data as the driving-behavior pattern of the driver.

3. The driving maneuver assisting apparatus as claimed in claim 1, wherein
the notifying section is configured to vary the contents of the maneuver assisting information in accordance with the learning level calculated by the learning level calculating section.

4. The driving maneuver assisting apparatus as claimed in claim 1,
wherein the driving maneuver assisting apparatus further comprises a driver determining section configured to determine a current driver of vehicle among at least two persons,
wherein the learning level calculating section is configured to calculate the learning level for the current driver determined by the driver determining section, and
wherein the notifying section is configured to notify of the maneuver assisting information in accordance with the learning level attained for the current driver determined by the driver determining section.

5. The driving maneuver assisting apparatus as claimed in claim 1, wherein
the driving maneuver assisting apparatus further comprises a first varying section configured to vary at least one of the threshold value and the non-steady-state degree so as to make it more difficult for the non-steady-state degree to exceed the threshold value as the learning level calculated by the learning level calculating section is lower.

6. The driving maneuver assisting apparatus as claimed in claim 5, wherein the first varying section is configured to increase the threshold value as the learning level calculated by the learning level calculating section is lower.

7. The driving maneuver assisting apparatus as claimed in claim 5, wherein
the first varying section is configured to reduce the non-steady-state degree as the learning level calculated by the learning level calculating section is lower.

8. The driving maneuver assisting apparatus as claimed in claim 1, wherein the driving maneuver assisting apparatus further comprises:
a judging section configured to detect a current running environment around a vehicle and to judge whether or not the detected current running environment differs from a predetermined standard environment; and
a second varying section configured to decrease the learning level calculated by the learning level calculating section when the judging section determines that the current running environment differs from the predetermined standard environment.

9. The driving maneuver assisting apparatus as claimed in claim 1, wherein the driving maneuver assisting apparatus further comprises:
a judging section configured to detect a current running environment around a vehicle and to judge whether or not the detected current running environment differs from a predetermined standard environment; and
a third varying section configured to vary at least one of the threshold value and the non-steady-state degree so as to make it difficult for the non-steady-state degree to exceed the threshold value, when the judging section determines that the current running environment differs from the predetermined standard environment.

10. The driving maneuver assisting apparatus as claimed in claim 1,
wherein the driving maneuver assisting apparatus further comprises a judging section configured to detect a current running environment around a vehicle and to judge whether or not the detected current running environment differs from a predetermined standard environment, and
wherein the notifying section is configured to suppress the provision of the maneuver assisting information, when the judging section determines that the current running environment differs from the predetermined standard environment.

11. The driving maneuver assisting apparatus as claimed in claim 8, wherein
the judging section is configured to detect a current brightness around the vehicle, and to determine that the current running environment differs from the predetermined standard environment when the detected current brightness is lower than a predetermined standard state.

12. The driving maneuver assisting apparatus as claimed in claim 8, wherein
the judging section is configured to detect a current weather state around the vehicle, and to determine that the current running environment differs from the predetermined standard environment when the detected current weather state is worse than a predetermined standard state.

13. The driving maneuver assisting apparatus as claimed in claim 8, wherein
the judging section is configured to detect a current traffic volume around the vehicle, and to determine that the current running environment differs from the predetermined standard environment when the detected current traffic volume is higher than a predetermined standard state.

14. A driving maneuver assisting method comprising: learning a driving-behavior pattern of a driver for a predetermined duration, using a learning section; calculating a non-steady-state degree by comparing a current driving-behavior pattern with the learned driving-behavior pattern, wherein the non-steady-state degree represents how different the current driving-behavior pattern is from the learned driving-behavior pattern, using a non-steady-state degree calculating section; calculating a learning level, using a learning level calculating section; notifying the driver of maneuver assisting information for inducing the learned driving-behavior pattern, when the calculated non-steady-state degree exceeds a threshold value, using a notifying section; and wherein the notifying section provides contents of the maneuver assisting information in more detail as the learning level calculated by the learning level calculating section becomes higher, and wherein the learning level calculating section calculates the learning level of the learning section in accordance with a number of data points already acquired as the driving-behavior pattern of the driver by the learning section.

\* \* \* \* \*